3,826,758
METHOD OF PREPARING EXHAUST CATALYST

Gordon H Hoffman, Towson, and Charles Philipp Brundrett, Baltimore, Md., assignors to W. R. Grace & Co., New York, N.Y.
No Drawing. Filed May 25, 1972, Ser. No. 256,922
Int. Cl. B01j *11/06, 11/40*
U.S. Cl. 252—455 R                                    5 Claims

ABSTRACT OF THE DISCLOSURE

The present invention is directed to an improved method of preparing catalytic systems containing copper oxide, chromic oxide, manganese dioxide, and palladium on a porous support. The method includes impregnating a support which may be activated alumina with aqueous copper dichromate solution, drying the impregnated support, impregnating the dried support with a manganese salt-palladium salt solution, drying the resulting catalyst system, and activating the catalyst by calcination. Catalysts prepared by this method are typically characterized with excellent crushing strength and improved resistance to shrinkage. The catalysts are especially useful for treating exhaust gases from internal combustion engines.

---

The present invention relates to a new improved method of preparing a catalytic system for treating exhaust gases from internal combustion engines. Catalysts prepared by the present method are characterized with improved resistance to shrinkage and excellent crushing strength.

The recent emphasis on the preparation of catalysts capable of converting the noxious components of automobile exhaust to innocuous entities has led to research in several related areas. The catalyst for conversion of automobile exhaust must have several characteristics. It must, of course, be active for conversion of hydrocarbons and carbon monoxide over a long period of time under a wide variety of temperatures.

The temperature in an automobile muffler ranges from ambient temperature, which varies widely throughout the year, to temperatures in excess of 1500° F. The active components of the catalyst must be supported on a base which can withstand changes in temperature from below zero, in some cases, to above 1500° F. over relatively short periods of time. In addition, this base must be resistant to shrinkage, crushing and attrition.

A catalyst base that shrinks in excess of 20 percent when exposed to temperatures of about 2100° F. is limited usefulness as a base for an auto exhaust conversion catalyst. If 20 percent of the muffler is void space it is obvious that a substantial portion of the exhaust gases will by-pass the catalyst. In addition, this void space leads to problems of excessive attrition of the catalyst and loss of a portion of the catalyst from the muffler.

It has now been found by practice of the present invention that improved internal combustion engine exhaust catalysts may be prepared in simple efficient manner. Catalysts prepared using the method of this invention typically have high crushing strength and excellent thermal stability, including improved shrink resistance at elevated temperatures.

Although the present invention is not limited to any particular theory of operation, observations indicate that improvements in the catalyst are effected by the novel manner of depositing copper oxide (CuO) and chromic oxide ($Cr_2O_3$) on the catalyst base.

Generally stated, the present method of preparing a shrink-resistant catalyst for treating exhaust gases from internal combustion engines includes preparing a copper dichromate solution by mixing a soluble alkaline copper salt with aqueous chromic acid solution in approximately stoichiometric amounts, impregnating a suitable porous, high surface area base with the copper dichromate solution, and drying the impregnated base. The dried base is impregnated with a manganese salt-palladium salt solution followed by drying the thus impregnated base. The final step in preparing the catalyst is calcination for from about 1 to about 5 hours at a temperature of from about 1300° F. to about 1500° F.

The impregations are carried out with appropriate amounts of solutions containing appropriate amounts of the catalytic salts so that the calcined catalyst comprises from about 0.1 to about 10 and preferably from about 2 to about 6 weight percent copper oxide, from about 0.2 to about 20 and preferably from about 6 to about 10 weight percent chromic oxide, from about 0.2 to about 12 and preferably from about 6 to about 8 weight percent manganese dioxide, and from about 0.001 to about 1 and preferably from about 0.01 to about 0.05 weight percent palladium, impregated on the base.

The aqueous copper dichromate solution is prepared by mixing a soluble alkaline copper salt with aqueous chromic acid solution in appropriate amounts such that from about 0.2 to about 0.4 part by weight copper, and preferably about 0.32 part by weight copper, is added per one part by weight chromic acid ($CrO_3$). The alkaline copper salt may be mixed initially with water prior to mixing the salt with the chromic acid solution. Although almost any order of addition is operable, preferably the alkaline copper salt is added to the chromic acid solution. Typically, slower addition results in improved properties of the catalyst ultimately prepared. Preferably, the addition is stirred until evolution of carbon dioxide is complete. Almost any soluble alkaline copper salt may be used in preparing the copper dichromate solution. Suitable copper salts include basic cupric carbonate ($CuCO_3 \cdot Cu(OH)_2$), cupric oxide (CuO), cupric hydroxide ($Cu(OH)_2$), basic cupric sulfate ($CuSO_4 \cdot CuO$) and the like. Particularly good results have been observed with basic copper carbonate ($CuCO_3 \cdot Cu(OH)_2$), especially in solutions prepared by slowly adding the salt to aqueous chromic acid solution using a molar ratio of approximately 4:1 of the acid to the salt. The aqueous chromic acid solution may be obtained commercially or prepared by dissolving chromic anhydride in an aqueous medium, e.g., water. The chromic anhydride may be dissolved in any effective amount up to its limit of solubility.

After mixing the soluble alkaline copper salt with the chromic acid solution, the solution volume may be adjusted to the saturation point of the base being impregnated.

Preferably, the soluble alkaline copper salt is added to a relatively concentrated aqueous chromic acid solution, followed by dilution with water to the base saturation point. For example, if a solution is prepared containing an appropriate amount of copper dichromate in 500 cubic centimeters (cc.) of solution, a sufficient amount of water would be added to adjust the solution volume to 1000 cc. for impregnating 1000 grams of a base having a saturation point of one cc. per gram. Conversely, sufficient amount of water would be evaporated from the same solution to yield 400 cc. of solution for impregnating 800 grams of a base having a saturation point of 0.5 cc. per gram. However, it is to be understood that the amount of solution used in impregnation is not critical. In general, suitable impregnation is effected using from about 0.8 to about 1.2 cc. of solution per gram of base.

The copper dichromate solution must be prepared from appropriate amounts of the alkaline copper salt and chromic acid such that impregnation of the base being treated results in a final catalyst including from about 0.1 to about 10 weight percent copper oxide (CuO) and from about 0.2 to about 20 percent by weight chromic oxide ($Cr_2O_3$).

After the copper dichromate solution has been prepared, a suitable base is impregnated with the solution. The base or support for the catalyst should have a high surface area and be a relatively porous material in order that maximum activity will be exhibited by the catalytic components. The supports should also have good physical properties to aid in increasing resistance to attrition. Suitable supports include alumina, silica-alumina, silica-magnesia, zirconia, zirconia-alumina, zirconia-magnesia, and the like.

Particularly good results are obtained in using gamma-type alumina as the catalyst support. This support may be used in a powder, granulated, pilled or extruded form. A particularly desirable support is the gamma-type alumina which is commercially available in the form of nodules. These nodules have a very desirable combination of properties. They are porous and have a high surface area.

The size of the nodules has some bearing on the activity of the catalyst. The preferred size of these nodules is about 5 to 8 mesh (the Tyler standard screen scale). However, satisfactory results have been obtained when the nodules are in the range of about 3 to 10 mesh (the Tyler standard screen scale).

After the copper dichromate impregnation step is complete, the impregnated material is dried in any suitable manner. Preferably, drying is effected in the presence of steam, air or a mixture of air and steam at a temperature of about 120 to 260° F.

After the catalyst is dried, it is reimpregnated with additional copper dichromate solution, if desired, to increase the copper oxide and chromic oxide content. Drying is repeated following each such reimpregnation.

After the desired amounts of copper oxide and chromic oxide have been deposited, the catalyst is impregnated with an aqueous mixture of manganese salt with palladium salt. The manganese salt is selected from manganese acetate and manganese nitrate. The acetate is preferred. Suitable palladium salts include palladium nitrate, palladium sulfate, palladium bromide, palladium chloride, and the like. Palladium nitrate is generally preferred. The manganese salt-palladium salt solution may be prepared by mixing the salts with water using any effective sequence of addition. Preferably, the salts are separately dissolved in desired amounts to form separate solutions, followed by adding the palladium salt solution to the manganese salt solution. These salts are present in the mixed solution in appropriate amounts and the impregnation is effected using appropriate amounts of the manganese salt-palladium salt solution such that the final catalyst contains from about 0.2 to about 12 percent by weight manganese dioxide ($MnO_2$), and from about 0.0001 to about 1 percent by weight palladium (Pd). Preferably, this impregnation is carried out using a solution the volume of which has been adjusted to correspond with the catalyst saturation point.

After the catalyst being prepared has been impregnated with a desired amount of the aqueous solution of manganous salt and palladium salt, the catalyst is dried in any suitable manner. Preferably, drying is effected in the presence of steam, air, or a mixture of steam and air at 120 to 260° F. This sequence of impregnation and drying may be repeated, if desired, to increase the amounts of manganese dioxide and palladium in the final catalyst.

After the desired amounts of $MnO_2$ and Pd have been deposited, the catalyst is calcined for from about 1 to about 5 hours at a temperature of from about 1300° F. to about 1500° F., and preferably at about 1400° F.

A very desirable set of characteristics for an auto exhaust catalyst base is relatively low density and high crushing strength. Materials having a low density obviously have a high capacity for absorption of the liquids containing the metal salts. In addition, this low density decreases the net weight of the muffler and catalyst assembly.

The crushing strength data for the catalyst in the examples which follow was determined using ASTM procedure D695–69.

The determination was made by selecting twenty-five typical specimens. The test was conducted by using a standard testing machine capable of control of constant rate-of-crosshead movements. The device was equipped with a drive mechanism, a supporting jig and a compressive tool for applying the load to the test specimen. The tool is so constructed that loading is axial within 1:1000 and applied to surfaces that are flat within 0.025 millimeter and parallel to each other in a plane normal to the vertical loading axis.

The original cross-sectional areas of the specimens are calculated and the crushing strength calculated by dividing the load carried by the specimens at the yield point by the original minimum cross-sectional area of the specimen. The results were expressed in pounds per square inch (pounds). The average of twenty-five specimens was reported as the crushing strength of the product.

The present invention is further illustrated by the following non-limiting examples, wherein the impregnating solutions were prepared from commercially available chemicals.

EXAMPLE 1

55.6 grams of basic copper carbonate

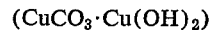
$$(CuCO_3 \cdot Cu(OH)_2)$$

was slowly added with stirring to 500 cc. of 100.6 grams of chromic acid ($CrO_3$) in water. Stirring was continued until evolution of carbon dioxide gas was substantially complete. Water was added to the resulting solution in sufficient amount to increase the solution volume to 860 cc. This solution included 0.082 grams/cc. of copper dichromate.

860 grams of commercially available gamma type alumina nodules having a saturation point of one cc./g. was impregnated with 860 cc. of the copper dichromate-containing solution by contacting the nodules with the solution. The nodules were found to be saturated with the solution. The impregnated nodular base was dried at 250° F.

169.2 grams of manganous acetate

$$(Mn(CH_3COO)_2 \cdot 4H_2O)$$

was added to 300 cc. of water. To this solution was added 2 cc. of 10 weight percent aqueous palladium nitrate. The volume of the resulting manganous acetate-palladium nitrate solution was adjusted to 500 cc. by adding water in the necessary amount. This solution was then impregnated onto the catalyst assembly using a conventional contact-impregnation procedure. After impregnation to the saturation point, the catalyst was again dried at 250° F. The dried catalyst was activated by calcination for 4 hours at 1400° F. The catalyst assembly included 4 percent by weight copper oxide (CuO), 7.6 percent by weight chromium oxide ($Cr_2O_3$), 6 weight percent manganese dioxide ($MnO_2$) and 0.02 percent palladium.

Crushing strength of the thus prepared catalyst was 9.2 pounds determined by the procedure set out in the above description. The density was 0.65 gram/cc. as measured by standard techniques well known in the art.

EXAMPLE 2

A portion of the catalyst nodules prepared in Example 1 were calcined at 1600° F. for 3 hours, after which time tests showed that the nodules shrank 2 percent durnig this calcination.

EXAMPLE 3

Another portion of the catalyst nodules prepared in Example 1 were calcined at 1600° F. for 2 hours. Tests showed that these nodules underwent 2 percent shrinkage during the calcination test of this Example.

It is apparent from these Examples that the catalyst nodules are eminently suitable for use in high temperature environments such as automobile exhaust systems where minimum shrinkage, high crush strength and low density are critical.

It is to be understood that the foregoing detailed description is given by way of illustration and that variations may be made therein without departing from the spirit or scope of the present invention.

What is claimed is:

1. A method of preparing a shrink-resistant catalyst for treating exhaust gases from internal combustion engines which comprises
   (a) preparing a copper dichromate solution by mixing a soluble alkaline copper salt with aqueous chromic acid solution in appropriate amounts such that from about 0.2 to about 0.4 part by weight copper is added per one part by weight chromic acid;
   (b) impregnating a porous, high surface area base selected from the group consisting of alumina, silica-alumina, silica-magnesia, zirconia, zirconia-alumina and zirconia-magnesia with said copper dichromate solution;
   (c) drying said copper dichromate solution impregnated base;
   (d) preparing a manganese salt-palladium salt solution wherein the manganese salt is manganese acetate or nitrate;
   (e) impregnating the dried base with said manganese salt-palladium salt solution;
   (f) drying the manganese salt-palladium salt solution impregnated base; and
   (g) calcining the base dried in step (f) for from about 1 to about 5 hours at a temperature of from about 1300° F. to about 1500° F. to prepare a shrink-resistant catalyst, said solutions being prepared with appropriate amounts of the catalytic salts and said impregnations being carried out with appropriate amounts of said solutions so that the catalyst comprises from about 0.1 to about 10 weight percent copper oxide, from about 0.2 to about 20 weight percent chromic oxide, from about 0.2 to about 12 weight percent manganese dioxide, and from about 0.001 to about 1 weight percent palladium, impregnated on said base.

2. The method of Claim 1 wherein the copper salt is basic copper carbonate.

3. The method of Claim 2 wherein from about 0.5 to about 0.6 part by weight basic copper carbonate is added per one part by weight chromic acid.

4. The method of Claim 1 wherein said impregnations are carried out with appropriate amounts of said solutions such that the catalyst comprises from about 2 to about 6 weight percent copper oxide, from about 6 to about 10 weight percent chromic oxide, from about 6 to about 8 weight percent manganese dioxide, and from about 0.01 to about 0.05 weight percent palladium.

5. The method of Claim 1 wherein the base is gamma type alumina.

References Cited
UNITED STATES PATENTS

| | | | |
|---|---|---|---|
| 3,235,514 | 2/1966 | Kuwata et al. | 252—471 X |
| 3,295,918 | 1/1967 | Briggs et al. | 252—465 X |
| 3,698,859 | 10/1972 | Velten | 252—476 X |
| 2,005,412 | 6/1935 | Connolly et al. | 252—471 |

CARL F. DEES, Primary Examiner

U.S. Cl. X.R.

252—458, 465, 471